United States Patent
Moiyallah, Jr. et al.

(10) Patent No.: US 10,284,538 B2
(45) Date of Patent: May 7, 2019

(54) SYSTEM FOR PROCESSING AN EVEN REQUEST BY DETERMINING A MATCHING USER PROFILE BASED ON USER IDENTIFYING INFORMATION

(71) Applicant: Bank of America Corporation, Charlotte, NC (US)

(72) Inventors: Samuel Massa Moiyallah, Jr., Newark, DE (US); Joseph Benjamin Castinado, North Glenn, CO (US); Susan J. Moss, Vestal, NY (US)

(73) Assignee: Bank of America Corporation, Charlotte, NC (US)

( * ) Notice: Subject to any disclaimer, the term of this patent is extended or adjusted under 35 U.S.C. 154(b) by 227 days.

(21) Appl. No.: 15/335,009

(22) Filed: Oct. 26, 2016

(65) Prior Publication Data

US 2018/0115540 A1    Apr. 26, 2018

(51) Int. Cl.
*H04L 29/06* (2006.01)
*H04W 12/06* (2009.01)
*G06F 21/31* (2013.01)
*G06F 21/32* (2013.01)

(52) U.S. Cl.
CPC .......... *H04L 63/08* (2013.01); *G06F 21/316* (2013.01); *H04L 63/0492* (2013.01); *H04L 63/06* (2013.01); *H04L 63/0853* (2013.01); *H04L 63/102* (2013.01); *H04W 12/06* (2013.01); *G06F 2221/2111* (2013.01)

(58) Field of Classification Search
CPC .......... H04L 63/08; H04L 63/06; G06F 21/36
USPC .................................................. 726/7
See application file for complete search history.

(56) References Cited

U.S. PATENT DOCUMENTS

| 5,343,529 | A  | 8/1994  | Goldfine et al. |
| 5,930,804 | A  | 7/1999  | Yu et al. |
| 6,978,023 | B2 | 12/2005 | Dacosta |
| 7,212,806 | B2 | 5/2007  | Karaoguz |
| 7,308,251 | B2 | 12/2007 | Karaoguz |
| 7,865,937 | B1 | 1/2011  | White et al. |
| 7,933,589 | B1 | 4/2011  | Mamdani et al. |
| 8,285,639 | B2 | 10/2012 | Eden et al. |
| 8,295,898 | B2 | 10/2012 | Ashfield et al. |
| 8,600,855 | B2 | 12/2013 | Winters et al. |
| 8,693,990 | B2 | 4/2014  | Facemire et al. |

(Continued)

*Primary Examiner* — Haresh N Patel
(74) *Attorney, Agent, or Firm* — Michael A. Springs; Moore & Van Allen PLLC; Peter B. Stewart

(57) ABSTRACT

Disclosed is an event processing and identity validation system. The system typically includes a processor, a memory, and an event processing and identity validation module stored in the memory. The system is typically configured for: validating a set of identity information for each profile of a set of profiles, receiving an event request comprising user identifying information, comparing the user identifying information with the sets of identity information of the set of profiles to determine a matching profile, processing the event request by generating an authentication code, notifying the user of the event request, determining that a device of the user is within a defined distance of an authentication location and automatically transmitting the generated authentication code to the device of the user, receiving a key code from a computing device, and determining a match between the key code and the authentication code to complete the event request.

20 Claims, 8 Drawing Sheets

(56) References Cited

U.S. PATENT DOCUMENTS

| | | |
|---|---|---|
| 8,898,760 B2 | 11/2014 | Wheeler |
| 8,904,496 B1 | 12/2014 | Bailey et al. |
| 9,014,666 B2 | 4/2015 | Bentley et al. |
| 9,098,688 B1 | 8/2015 | Jackson |
| 9,183,436 B2 | 11/2015 | Baker et al. |
| 9,305,298 B2 | 4/2016 | Wilson |
| 9,367,676 B2 | 6/2016 | Wilson |
| 9,398,011 B2 | 7/2016 | Thompson |
| 10,007,909 B2* | 6/2018 | Collinge ............. H04L 63/0428 705/18 |
| 2004/0172535 A1* | 9/2004 | Jakobsson ............ G06Q 20/341 713/168 |
| 2005/0202830 A1 | 9/2005 | Sudit |
| 2007/0094152 A1 | 4/2007 | Bauman et al. |
| 2008/0249934 A1 | 10/2008 | Purchase et al. |
| 2009/0112657 A1 | 4/2009 | Galuten et al. |
| 2011/0202416 A1 | 8/2011 | Buer et al. |
| 2012/0010930 A1 | 1/2012 | Langdon et al. |
| 2014/0046786 A1* | 2/2014 | Mazaheri ............. G07G 1/0081 705/18 |
| 2014/0156531 A1 | 6/2014 | Poon et al. |
| 2014/0263622 A1 | 9/2014 | Babatz et al. |
| 2015/0088744 A1 | 3/2015 | Raduchel |
| 2015/0237036 A1* | 8/2015 | Ng ......................... H04L 63/08 726/6 |
| 2015/0302402 A1 | 10/2015 | Chan Chi Yuen |
| 2015/0302409 A1 | 10/2015 | Malek et al. |
| 2015/0310434 A1 | 10/2015 | Cheung |
| 2015/0365423 A1* | 12/2015 | Prokopi ................ G06F 21/316 713/152 |
| 2016/0224776 A1* | 8/2016 | Leow ..................... G06F 21/34 705/18 |
| 2016/0239657 A1* | 8/2016 | Loughlin-Mchugh ...................... H04L 63/0807 705/18 |
| 2016/0241532 A1* | 8/2016 | Loughlin-Mchugh ...................... H04L 63/0838 705/18 |
| 2017/0099148 A1* | 4/2017 | Ochmanski ........... H04L 9/3247 705/18 |
| 2018/0061033 A1* | 3/2018 | Bastide ................. G06T 7/0002 705/18 |
| 2018/0068173 A1* | 3/2018 | Kolleri ............. G06K 9/00288 705/18 |
| 2018/0069937 A1* | 3/2018 | Kolleri ................... H04L 67/22 705/18 |
| 2018/0176017 A1* | 6/2018 | Rodriguez ............ H04L 9/3213 705/18 |

\* cited by examiner

SYSTEM FOR PROCESSING AN EVEN REQUEST BY DETERMINING A MATCHING USER PROFILE BASED ON USER IDENTIFYING INFORMATION

FIELD OF THE INVENTION

The present invention embraces an electronic event processing and identity validation system that includes a processor, a memory, and an event processing and identity validation module stored in the memory. The system is typically configured for: validating a set of identity information for each profile of a set of profiles, receiving an event request comprising user identifying information, comparing the user identifying information with the sets of identity information of the set of profiles to determine a matching profile, processing the event request by generating an authentication code, notifying the user of the event request, determining that a device of the user is within a defined distance of an authentication location and automatically transmitting the generated authentication code to the device of the user, receiving a key code from a computing device, and determining a match between the key code and the authentication code to complete the event request.

BACKGROUND

Associating an event request with an appropriate user can be a challenging and a time consuming process. In addition, it can be challenging to ensure that the identity of such user is adequately authenticated. Thus, there exists a need for an improved system for processing incoming event requests.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for processing electronic events and validating identities of users linked with the electronic events. Embodiments of the present invention improve the processing speed of event request and also increase the efficiency of the event processing system.

In one aspect, the present invention embraces a computerized system, and an associated method and computer program product, for electronic event processing and identity validation. The system typically includes a processor, a memory, and a network communication device. The system also typically includes an event processing and identity validation module stored in the memory and executable by the processor. In one embodiment, the event processing and identity validation module is configured for: identifying a set of profiles associated with a set of users; for each profile of the set of profiles, identifying a set of identity information; for each profile of the set of profiles, validating the set of identity information; receiving an event request, wherein the event request comprises user identifying information; comparing the user identifying information with the sets of identity information of the set of profiles; determining a matching profile from the set of profiles based on comparing the user identifying information and the sets of identity information of the set of profiles, wherein the matching profile is associated with a user; and in response to determining the matching profile, processing the event request.

In a particular embodiment, the software module stored in the memory comprises executable instructions that when executed by the processor further causes the processor to generate an authentication code in response to validating the event request; associate the generated authentication code with the event request; notify the user of the event request; determine that a device of the user is within a defined distance of an authentication location and, based on determining that the device of the user is within the defined distance of the authentication location, automatically transmit the generated authentication code to the device of the user; receive a key code from a computing device, wherein the computing device receives the key code as an input from the user; compare the received key code with the generated authentication code; determine a match between the received key code and generated authentication code; and in response to determining the match between the received key code and generated authentication code, complete the event request.

In one particular embodiment, the software module stored in the memory comprises executable instructions that when executed by the processor further causes the processor to notify the user of the event request in response to processing the event request; prompt the user to upload a user image; receive the user image from a computing device; validate the user image by comparing information from the user image with the set of information associated with the matching profile; upon successful validation, complete the event request.

In one particular embodiment, the user identifying information comprises a first image, wherein determining the matching profile further comprises extracting information from the first image; comparing the extracted information from the first image with the sets of identity information of the set of profiles to determine the matching profile.

In such an embodiment, the software module stored in the memory comprises executable instructions that when executed by the processor further causes the processor to notify the user of the event request in response to validating the event request; prompt the user to upload an user image; receive the user image from a computing device; validate the user image by comparing information from the user image with the information from the first image; upon successful validation, complete the event request.

In some embodiments, validating the set of identity information is performed periodically.

In some embodiments, the system is maintained by an entity and the event request is transmitted by the entity.

In some embodiments, the event request is transmitted by a third party system, wherein validating the event request comprises sending a validation message to the third party system and transmitting at least a portion of the set of identity information of the matching profile.

BRIEF DESCRIPTION OF THE DRAWINGS

Figure 1:
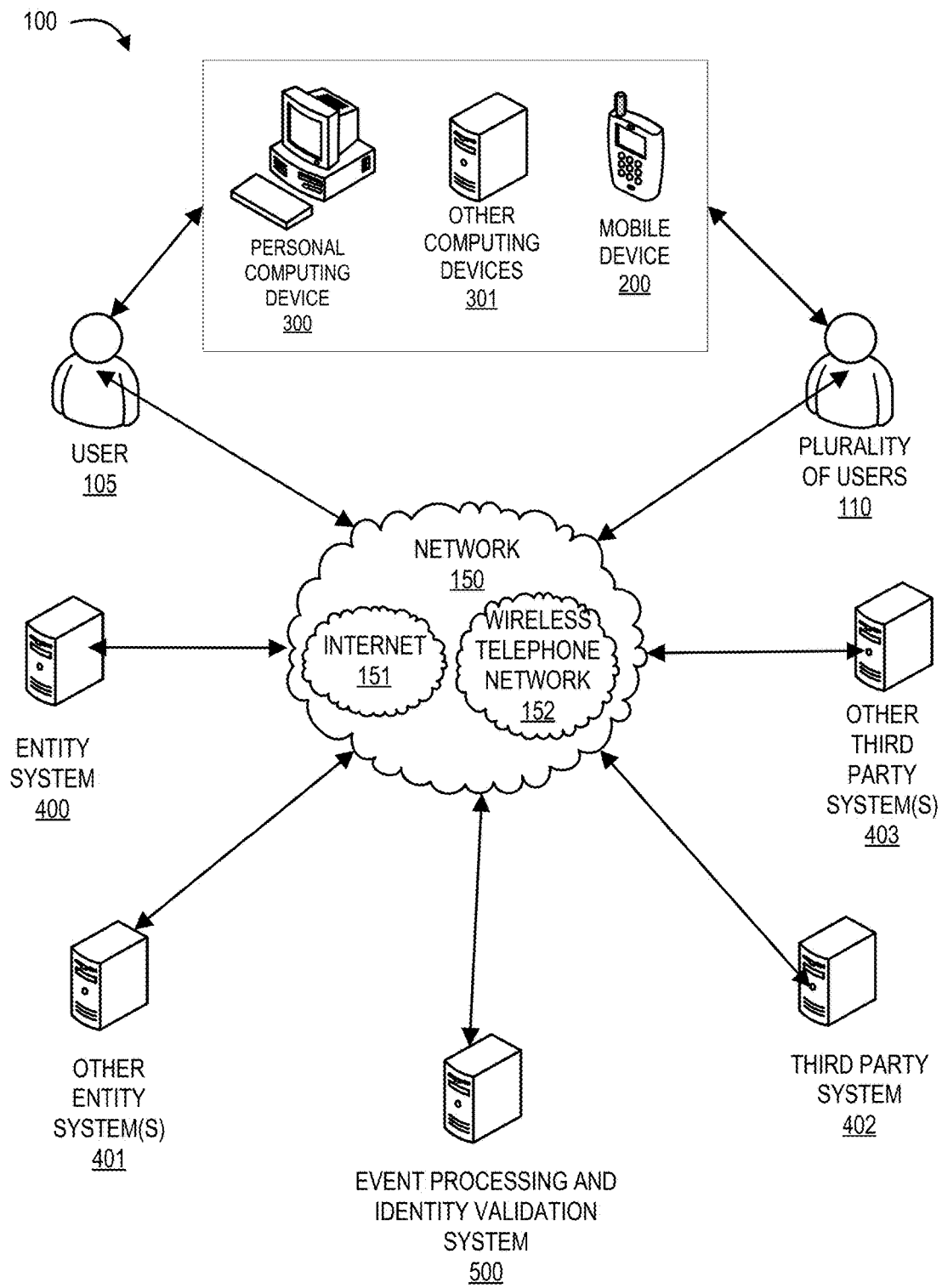
Figure 2:
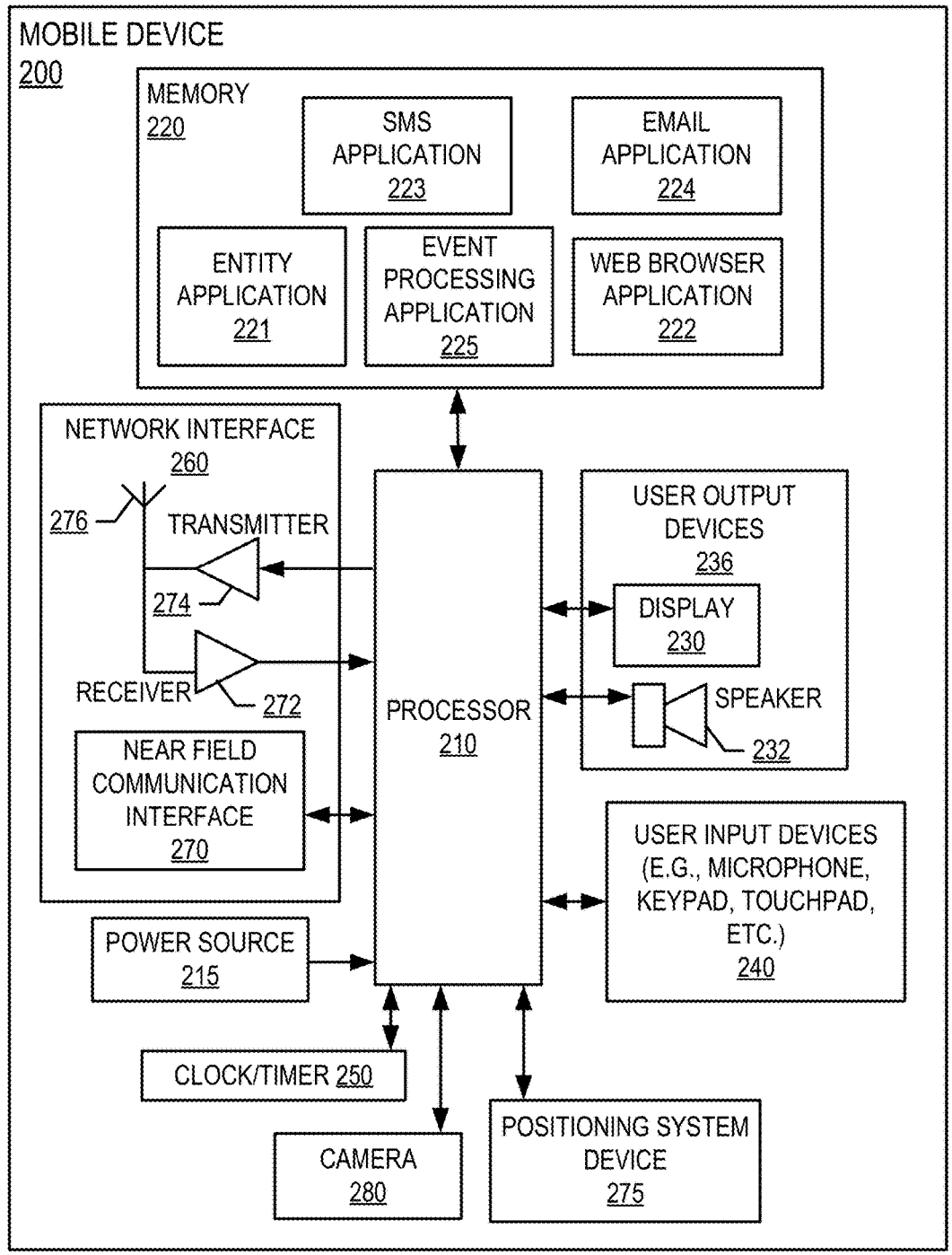
Figure 3:
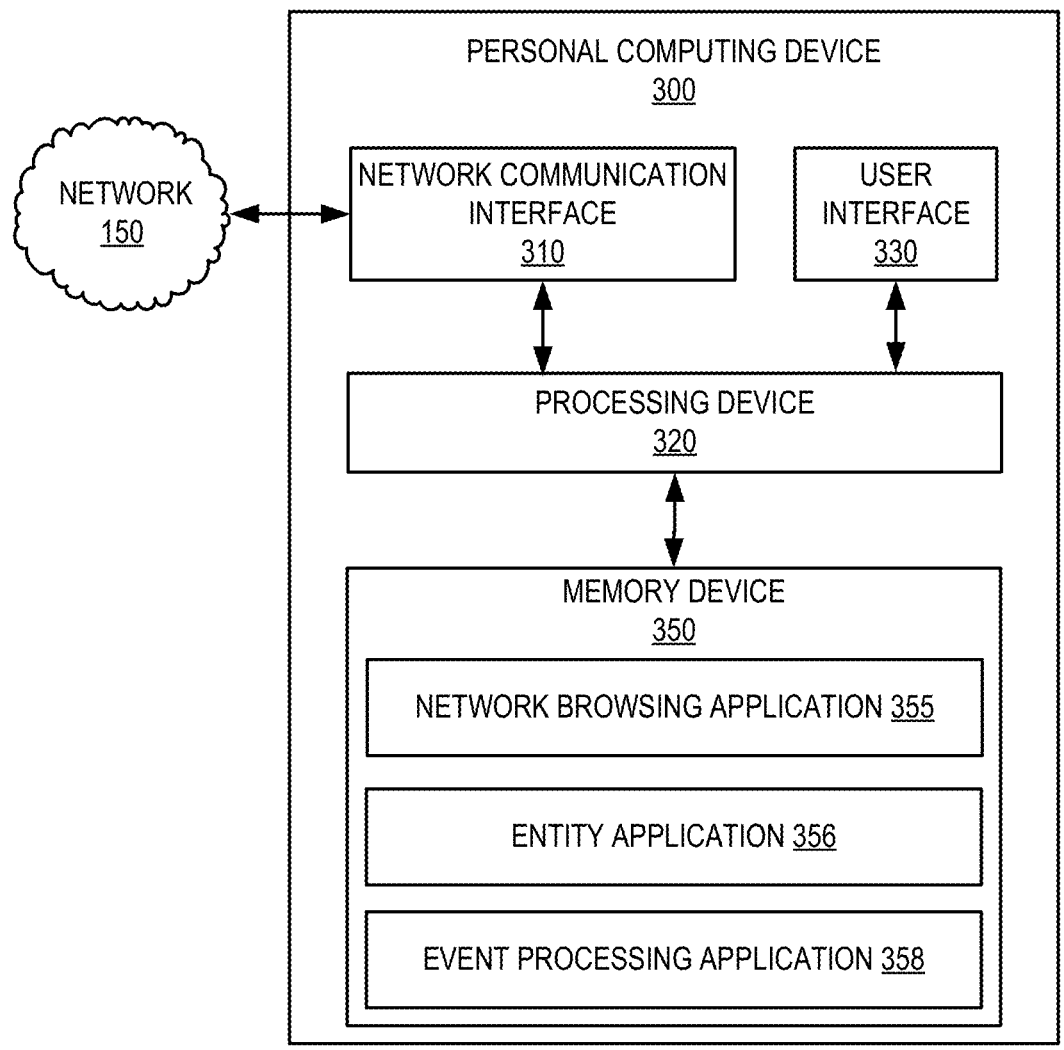
Figure 4:
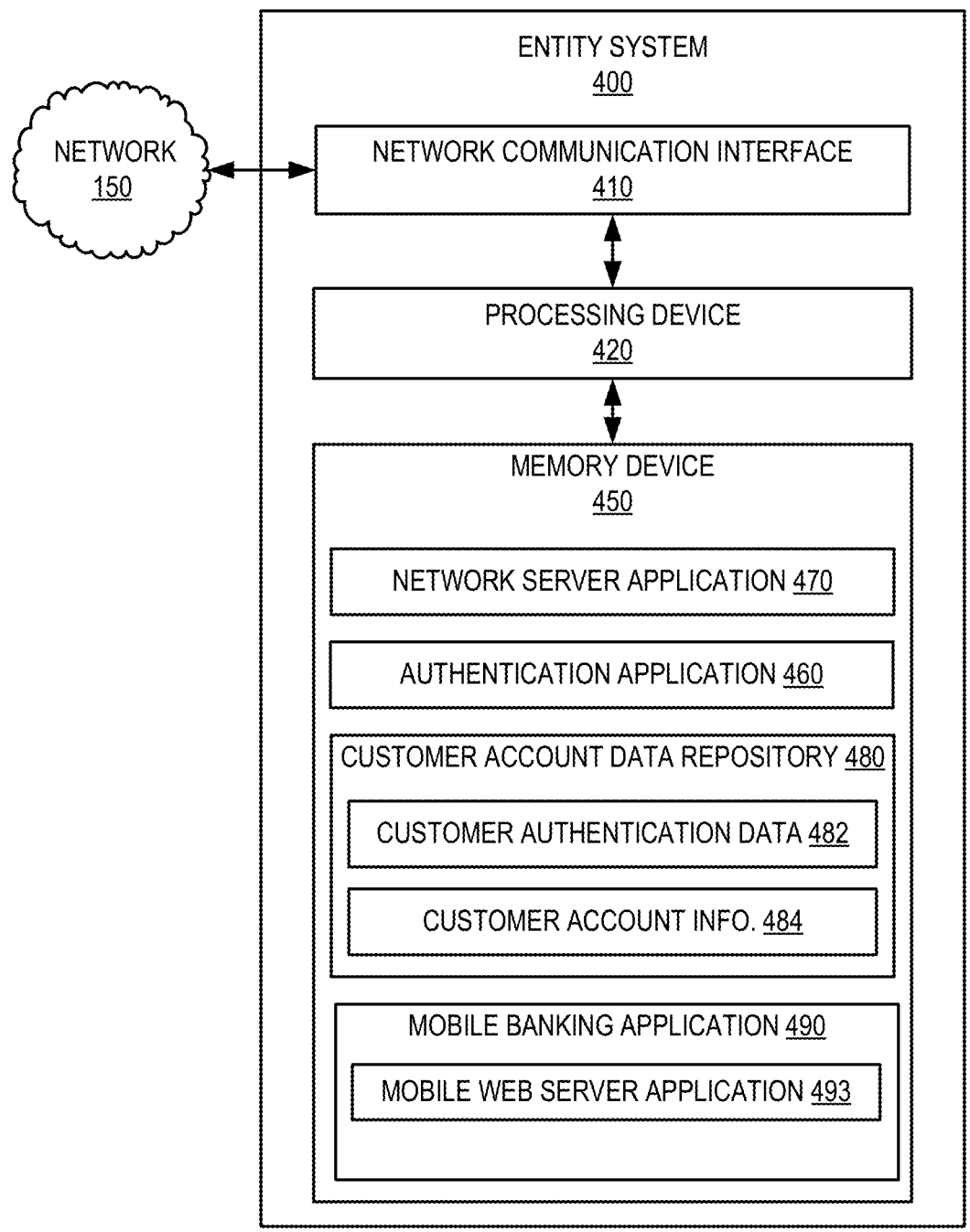
Figure 5:
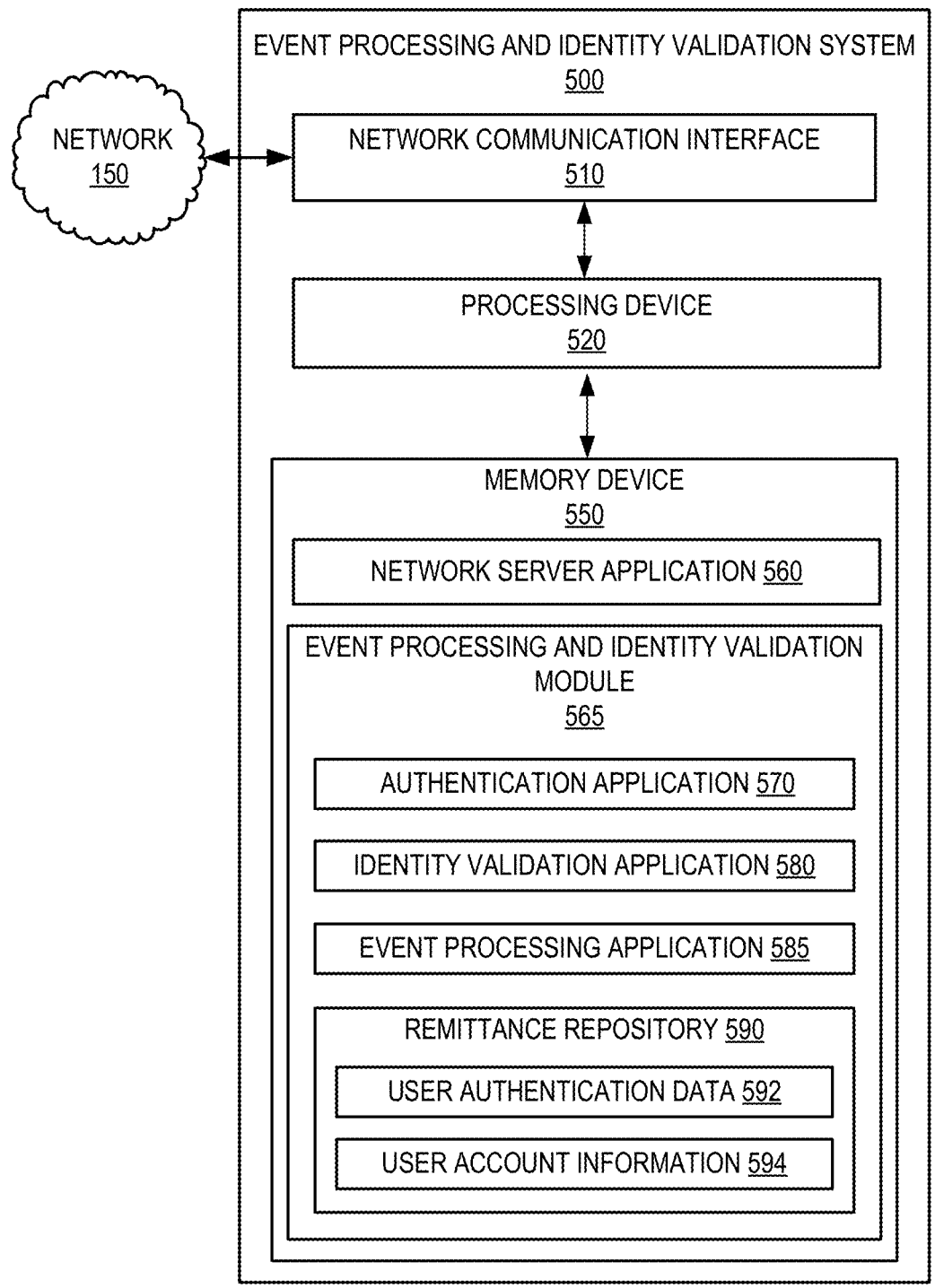
Figure 6:
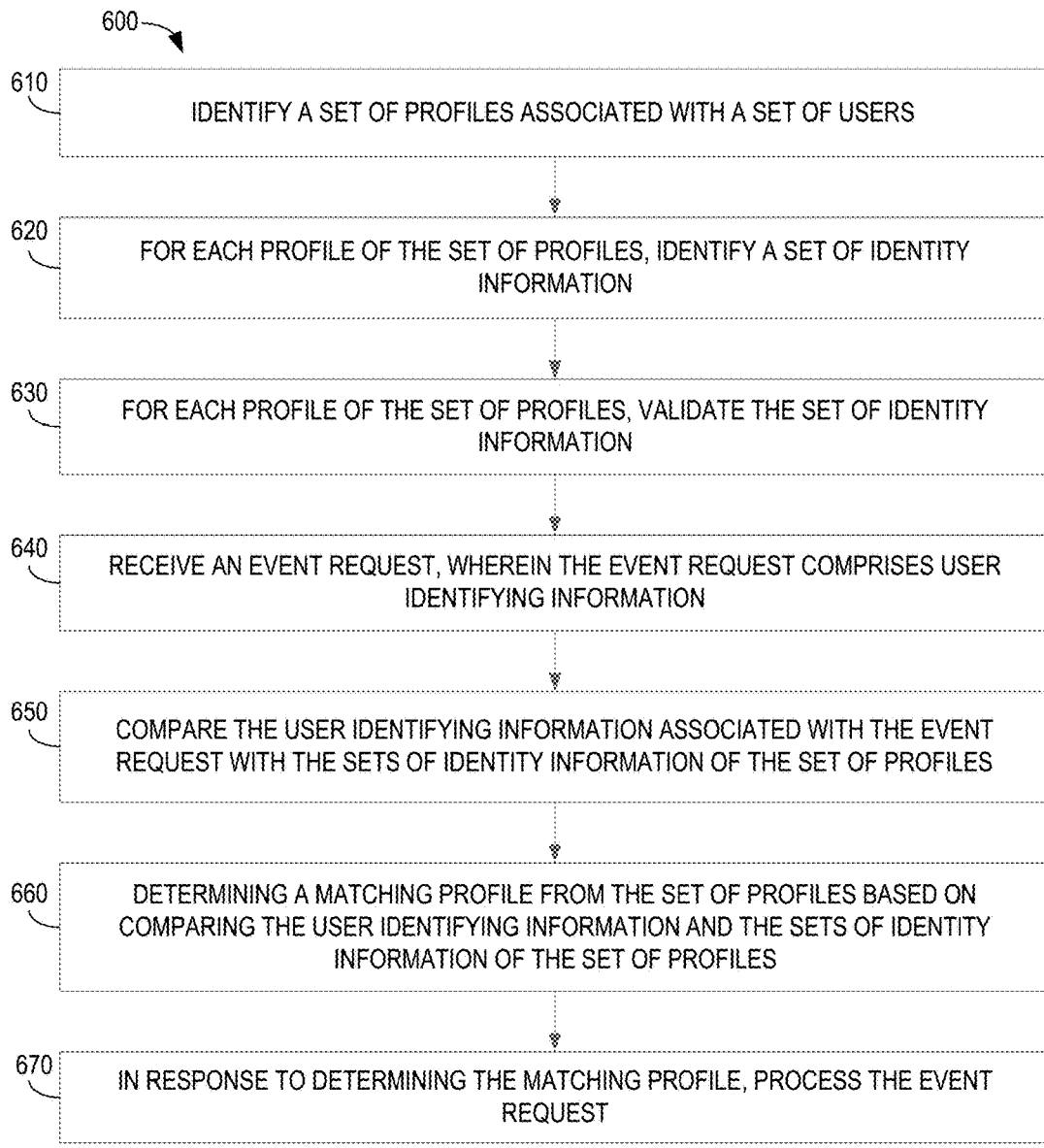
Figure 7:
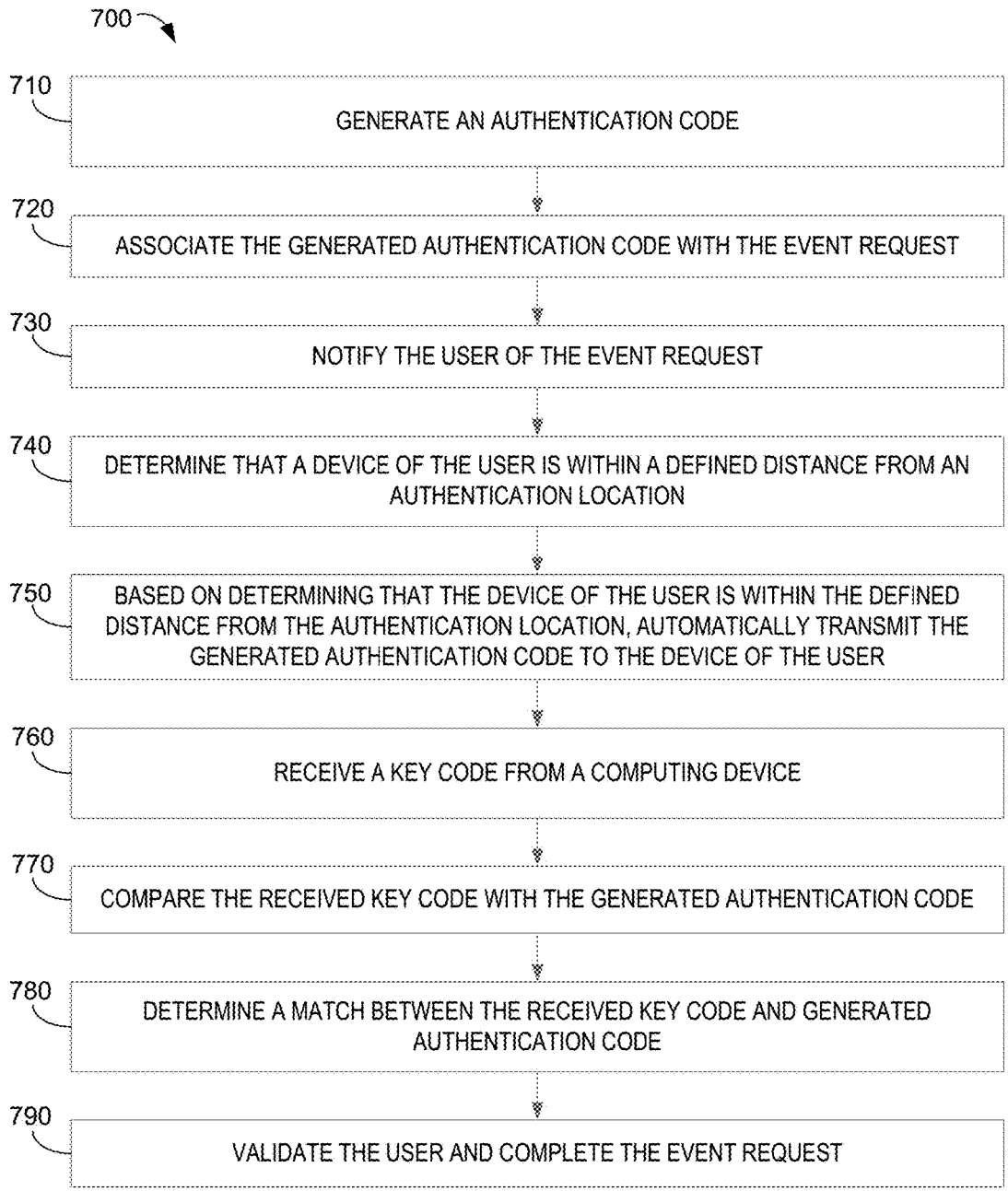
Figure 8:
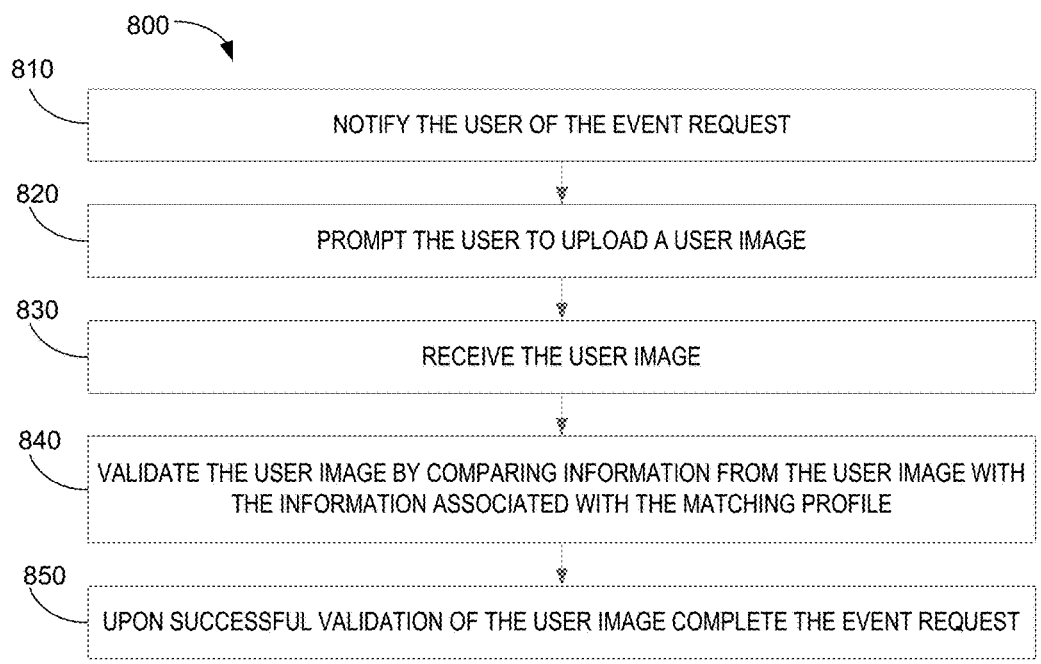

Having thus described some embodiments of the present invention in general terms, reference will now be made to the accompanying drawings, where:

FIG. 1 presents a block diagram illustrating the event processing and identity validation system in accordance with embodiments of the present invention;

FIG. 2 presents a block diagram illustrating a mobile device of a user illustrated in FIG. 1, in accordance with embodiments of the present invention;

FIG. 3 presents a block diagram illustrating a computing device of a user illustrated in FIG. 1, in accordance with embodiments of the present invention;

FIG. 4 presents a block diagram illustrating the entity system(s) of FIG. 1, in accordance with embodiments of the present invention;

FIG. 5 presents a block diagram illustrating the event processing and identity validation system of FIG. 1, in accordance with embodiments of the present invention;

FIG. 6 presents a process flow for processing event requests, in accordance with embodiments of the present invention;

FIG. 7 presents a process flow for validating the identity of a user associated with an event request using an authentication code, in accordance with embodiments of the present invention;

FIG. 8 presents a process flow for processing the event request and validating the identity of a user associated with an event request using a user image, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" and "third party system" may include any organization that processes financial transactions including, but not limited to, banks, credit unions, savings and loan associations, investment companies, stock brokerages, asset management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity.

In accordance with embodiments of the invention, an "event" or "event request" or "electronic event" may be a transaction, transfer of funds, transfer of resources, and may refer to any activities or communication between a user and an entity, between an entity and a third party system, activities or communication between multiple entities, communication between technology application and the like. Transfer of resources may refer to a payment, processing of funds, international transfer of funds, purchase of goods or services, a return of goods or services, a payment transaction, a credit transaction, or other interactions involving user's resource or account. In the context of financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, a user accessing their e-wallet, or any other interaction involving the user and/or the user's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; receiving remittances; loading money onto stored value cards (SVCs) and/or prepaid cards and/or international travel cards; paying salary to employees; donating to charities; and/or the like. Unless specifically limited by the context, a "transaction", a "transfer of funds", an "event", an "event request", a "transfer of resources" or "point of transaction event" refer to any activity initiated between a user and a resource entity or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points etc. When discussing the resource transfers or transactions are evaluated it could mean that the transactions has already occurred, is in the process of occurring or being processed, or it has yet to be processed/posted by one or more financial institutions.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/ output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Many of the embodiments and example implementations thereof described herein are directed toward solving a technical problem of validating the user identifying information associated with an event request, wherein the user identifying information is associated with the recipient of the event request. Validating the user identifying information is a time consuming process which involves communication with various third party systems to verify if the user identifying information is active. Another technical problem is that an unauthorized user may try to intercept and process the incoming event request resulting in an unauthorized transaction of the event request.

To solve these technical issues, the present invention embraces an event processing system that processes the event requests by adequately validating the user information associated with the event request and providing an extra layer of security while completing the event request. In particular, the event processing and identity validation system manages sets of user information associated with a set of profiles, wherein the sets of user information is validated periodically and using which the event processing and identity validation system authenticates the information of the user at the receiving end of the event request as soon as receiving the event request. This process facilitates the proper processing of event requests in real-time without any delays such as not recognizing the user at the receiving end after initiating the processing of event request. The event processing and identity validation system further authenticates the user at the receiving end of the event request by implementing authentication processes involving prompting the user to upload an identification image for the purpose of authentication or transmitting an authentication code generated by the event processing and identity validation system to the user upon determining that the user is within a defined distance of a secret location known to the user and later receiving the transmitted code from a computing device in order to complete the event request. This authentication process makes it difficult for unauthorized users to intercept and complete the event request, thus improving the security of the event processing and identity validation system.

FIG. 1 provides a block diagram illustrating an environment 100 for an electronic event processing and identity validation system. As depicted in FIG. 1, the operating environment 100 typically includes an event processing and identity validation system 500 interacting with entity system 400, other entity systems 401, third party system 402, other third party systems 403, plurality of users 110, and user 105 using a network 150. In some embodiments, the event processing and identity validation system 500 comprises a repository containing validated sets of identity information associated with a plurality of users. In some embodiments, the event processing and identity validation system 500 may be maintained by the entity system 400. In some embodiments, the event processing and identity validation system 500 may be owned by the entity system 400 and maintained by a third party system 402. In some embodiments, the event processing and identity validation system 500 may be a part of the entity system 400. In some embodiments, entity system 400, other entity systems 401, the third party system 402 and other third party systems 403 may be any systems seeking services from the event processing and identity validation system 500. In some embodiments, the entity system 400, other entity systems 401, the third party system 402 and other third party systems 403 may be any systems working cooperatively with the event processing and identity validation system 500. In some embodiments, the user 105 or any one of the plurality of users 110 may be a sender of the event request. In another embodiments, the user 105 or any one of the plurality of users 110 may be a recipient of the event request.

The environment 100 also may include a plurality of user devices. The user devices may include any machine, apparatus, system or the like that may be connected to and communicate with other devices over a network 150. At least one of the devices may include a personal computing device 300, other computing devices 301, mobile device 200 for use by the user 105 and plurality of users 110. The computing devices 301 may be any device that employs a processor and memory and can perform computing functions, such as a personal computing device 300 or a mobile device 200, that may be connected to or access the network 150. The personal computing device 300 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may include any mobile communication device, such as a cellular telecommunications device (i.e., a cell phone or mobile phone), personal digital assistant (PDA), a mobile Internet accessing device, tablet computer, or other mobile device. A mobile device may connect to the network by a cellular telecommunications network or by Wi-Fi, Bluetooth or other access technology.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the mobile device 200. In some embodiments, the NFC interface 270 is not supported in and/or on the mobile device 200, but the NFC interface 270 is otherwise operatively connected to the mobile device 200 (e.g., where the NFC interface 270 is a peripheral device plugged into the mobile device 200). Other apparatuses having NFC interfaces mentioned herein may be configured similarly. In some embodiments, the NFC interface 270 of the mobile device 200 is configured to contactlessly and/or wirelessly communicate information to and/or from a corresponding NFC interface of another apparatus (e.g., an automated teller machine (ATM) or another mobile or computing device).

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a location to determine that the mobile device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which include computer-executable instructions/code executed by the processor 210 to implement the functions of the mobile device 200 and/or one or more of the process/method steps described herein. The memory 220 includes an entity application 221 that may be used to allow communication with an entity system such as the entity system 400 and/or the smart devices to implement the system of the invention. The use of the entity application 221 may facilitate access to the system of the invention by providing log-in systems including user authentication systems, account information, system controls or the like. The memory 220 includes an event processing application 225 that may be used to communicate with the event processing and identity validation system 500. The entity application 221 and event processing application 225 communicate with the event processing and identity validation system 500 and the entity system 400 to allow the user to set up and/or control the system of the invention. In some embodiments, the entity application 221 is an online banking application.

These applications also typically provide a graphical user interface (GUI) on the display 230 that allows the user 110 to communicate with the mobile device 200, the entity system 400 and/or other devices or systems. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with an entity system 400.

As used herein, a "processor" or "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in memory device 350. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein. The memory device 350 may include such applications as a conventional web browsing application 355, an entity application 356, and/or an event processing application 358. The entity application 356 may be used to allow communication with an entity system, such as the entity system 400. The event processing application 358 may be used to allow communication with the event processing and identity validation system 500 and the entity system 400. The other computing devices 301 as shown in FIG. 1 may include similar system blocks as the personal computing device 300.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the entity system 400 described herein. For example, in one embodiment of the entity system 400, the memory device 450 includes, but is not limited to, a network server application 470, an authentication application 460, a customer account data repository 480 which includes customer authentication data 480 and customer account information 484, a mobile banking application 490 including a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the entity system 400 described herein, as well as communication functions of the entity system 400. The mobile banking application 490 communicates with the user computing device 120 to facilitate communication between the user and the entity.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the entity system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the personal computing device 300, and/or other computing devices 301. The processing device 420 is configured to use the network communication interface 410 to transmit and/or receive data and/or commands to and/or from the other devices connected to the network 150. The other entity system 401, third party system 402, and other third party system 403 may include similar system blocks as the entity system 400.

FIG. 5 provides a block diagram illustrating the event processing and identity validation system 500, in greater detail, in accordance with embodiments of the invention. As illustrated in FIG. 5, in one embodiment of the invention, event processing and identity validation system 500 includes one or more processing devices 520 operatively coupled to a network communication interface 510 and a memory device 550. In certain embodiments, event processing and identity validation system 500 is operated by an entity, such as a financial institution.

It should be understood that the memory device 550 may include one or more databases or other data structures/repositories. The memory device 550 also includes computer-executable program code that instructs the processing device 520 to operate the network communication interface 510 to perform certain communication functions of the event processing and identity validation system 500 described herein. For example, in one embodiment of the event processing and identity validation system 500, the memory device 550 includes, but is not limited to, a network server application 560 and event processing and identity validation module 565, wherein the event processing and identity validation module 565 includes, but is not limited to an authentication application 570, an identity validation application 580, event processing application 585, remittance repository 590 comprising user authentication data 592 and user account information 594, and other computer-executable instructions or other data. The computer-executable program code of the network server application 560, the authentication application 570, or the identity validation application 580, or the event processing application 585 may instruct the processing device 520 to perform certain logic, data-processing, and data-storing functions of the event processing and identity validation system 500 described herein, as well as communication functions of the event processing and identity validation system 500. The event processing application 585 communicates with the user personal computing device 300 or with the user mobile device 200 to facilitate communication between the user and the entity system or third party system.

In one embodiment, the remittance repository 590 includes user authentication data 592 and user account information 594. The network server application 560, the authentication application 570, the identity validation application 580, and the event processing application 585 are configured to invoke or use the user account information 594, the user authentication data 592 when authenticating a user to the event processing and identity validation system 500.

As used herein, a "communication interface" generally includes a modem, server, transceiver, and/or other device for communicating with other devices on a network. The network communication interface 510 is a communication interface having one or more communication devices configured to communicate with one or more other devices on the network 150, such as the mobile device 200, the personal computing device 300 and/or other computing devices 301. The processing device 520 is configured to use the network communication interface 510 to transmit and/or receive data and/or commands to and/or from the other devices connected to the network 150.

FIG. 6 illustrates a process flow 600 for processing event requests. As shown in block 610, the event processing and identity validation system 500 identifies a set of profiles associated with a set of users. In one embodiment, the set of users may be customers of the entity system 400. In another embodiment, the set of users may be customers of other entity systems 401. In some embodiments, the set of users may not be customers of entity system 400 or other entity systems 401. In some embodiments, the set of profiles may be stored in the database of the event processing and identity validation system 500. In some embodiments, the set of profiles may be stored in the database of the entity system 400, other entity system 401, third party system 402, and other third party systems 403.

At block 620, the event processing and identity validation system 500 identifies a set of identity information for each profile of the set of profiles. For example, a user may have multiple accounts associated with a phone number, the system 500, after identifying the phone number after accessing a profile of the user from the entity system 400, communicates with other third party systems to identify any other accounts associated with the phone number and upon identifying the phone number the system 500 extracts all the information associated with the account maintained by other third party systems. In some embodiments, the identity information may include a first name, last name, email address, phone number, photo identification card, credit card number, debit card number, account routing number, account number, home address, work address, Global Positioning System coordinates of most visited places, most frequently used Internet Protocol address, and/or the like for each user. In some other embodiments, the identity information may also include any digital identities and/or social networking identities of the users. The digital identities described herein may be a username assigned to an account associated with the user. In some embodiments, the identity information may also include all financial accounts associated with a user. For example, the identity information may include account number of the checking account, savings account, credit account, investment account, and/or the like associated with the user, wherein the accounts may or may not be managed by the same entity. In some embodiments, the event processing and identity validation system 500 may identify identity information by communicating with other systems such as other entity systems 401, third party system 402, and other third party systems 403. For example, a user 105 may have an account with a third party system and the account may be named under an alias or any other digital identity, the event processing and identity validation system extracts all the information associated with the account. In some embodiments, the event processing and identity validation system 500 communicates with other third party systems 403 to extract an image of the photo identification card for each profiles of the set of profiles. The event processing and identity validation system 500 identifies all such digital identities and associates the identified identities with the profile of the user. In some embodiments, the event processing and identity validation system 500 identifies set of identity information associated with each profile of the set of profiles and stores the set of identity information associated with each profile in the remittance repository 590 of the event processing and identity validation system 500. In alternate embodiments, the event processing and identity validation system 500 stores the identified information in the database of the entity system 400 and retrieves the stored information when required.

In some embodiments, the event processing and identity validation system 500, identifies Global Positioning System (GPS) coordinates of most visited places and stores the GPS coordinates with the set of information associated with each profile of the set of profiles. For example, the system 500 identifies the home address of a user and stores the GPS coordinates of the home address in the profile of the user. In some embodiments, the system 500 may identify the most visited places by constantly transmitting a ping to a user device and by utilizing machine learning algorithms. For example, the system 500 may ping the mobile device of a user at regular intervals to identify the location of mobile device and by using machine learning algorithms, the system 500 may identify a location as a most visited place. In some embodiments, the system 500 may identify the most visited place by identifying the Internet Protocol address of the user device.

At block 630, the event processing and identity validation system 500 validates the set of identity information for each profile of the set of profiles. The validation may be verifying the set of user information associated with each user of the set of users in order to associate the most recent set of information with the profile of each user of the set of users. In some embodiments, validating the set of identity information comprises implementing a set of routines, wherein the set of routines include communicating with multiple systems such as third party systems, other entity systems and other third party systems. For example, the event processing and identity validation system may validate the identity information of the user by communicating with a network provider to verify if the phone number is associated with the user. The event processing and identity validation system 500 may communicate with other third party systems to identify the network provider associated with the phone number. The event processing and identity validation system 500 also validates the credit cards and debits cards associated with the user by communicating with the entity system managing the debit card or credit card of the user. In some embodiments the event processing and identity validation system 500, upon detecting any changes to the identity information updates the set of identity information associated with the profile. For example, if the event processing and identity validation system detects that the phone number associated with the user has been disconnected, the event processing and identity validation system 500 updates the status of phone number from active to inactive, in the profile of the user. In some embodiments, the event processing and identity validation system 500 may prompt the user associated with the updated profile to enter new information associated with the change detected by the event processing and identity validation system 500. For example, if the event processing and identity validation system updates the phone number in the profile of the user, the event processing and identity validation system transmits a notification to the user device of the user to enter a new phone number. In some other embodiments, the event processing and identity validation system 500 upon detecting a change and updating the profile of the user also communicates with other systems to identify any new information associated with the change. For example, the event processing and identity validation system upon detecting a change to the credit card number of the user and updating the profile of the user by changing the status of the credit card number from active to inactive, the event processing and identity validation system may communicate with an entity system managing the credit card to identify a new credit card number assigned to the user. In some embodiments, the event processing and identity validation system 500 automatically updates the profile of the user based on the new identified information and prompts the user to verify the changes made to the profile of the user. For example, the event processing and identity validation system after updating the credit card number based on the new credit card number generated by the entity system managing the credit card of the user, prompts the user to verify the changes made to the credit card number. In some embodiments, the event processing and identity validation system 500 validates the identity information for each profiles of the set of profiles periodically. For example, the event processing and identity validation system may verify the identity information on a daily basis or the like. In some embodiments, a user may update the information in their profile by accessing the event processing application on the user devices such as mobile device 200 or personal computing device 300. For example, if the user has recently moved to a new address, the user can update the home address by logging into an event processing application installed on the mobile phone of the user.

As shown in block 640, the event processing and identity validation system 500 receives an event request, wherein the event request comprises user identifying information. The event request may be transfer of funds, international transfer of funds, transfer of resources, payments, and/or the like. In some embodiments, the event request may be transmitted by the entity system 400, wherein the entity system 400 receives the event request from a user at the sending end of the event request. For example, the event processing and identity validation system may receive an international transfer of funds request from a user of the entity system. In some embodiments, the event request may be transmitted by any other systems including other entity systems 401, third party system 402, other third party systems 403, and/or the like. In some embodiments, the event processing and identity validation system 500 event request may comprise user identifying information such as first name, last name, account number, email address, phone number, address, credit card number, and/or the like. In one embodiment, the event request may comprise any one of the user identifying information such as a phone number, email address, and/or the like. In some embodiments, the user identifying information may include a photo of the recipient associated with the event request.

At block 650, the event processing and identity validation system 500 compares the user identifying information with the sets of identity information of the set of profiles. For example, the event processing and identity validation system compares the user identifying information comprising a digital identity of a recipient with the sets of identity information comprising digital identities of set of profiles associated with set of users. In some embodiments, the event processing and identity validation system 500 compares all parameters of the user identifying information with the sets of identity information of the set of profiles. In some other embodiments, the event processing and identity validation system 500 compares any one parameter of the user identifying information with the sets of identity information of the set of profiles. For example, if the user identifying information comprises first name, last name, and phone number, the event processing and identity validation system compares the phone number with the sets of identity information comprising phone numbers of set of profiles.

As shown in block 660, the event processing and identity validation system 500 determines a matching profile from the set of profiles based on comparing the user identifying information and the sets of identity information of the set of profiles. In some embodiments, if the comparison results in more than one matching profile, the event processing and identity validation system 500 performs another search by combining one or more parameters of the user identifying information. For example, the event processing and identity validation system may perform comparison initially using the last name and the address which may result in more than one matching profiles, the event processing and identity validation system narrows the search further by comparing the phone number from the user identifying information with the sets of identity information of the more than matching profiles associated with the result of the initial search comprising more than one matching profiles. In some embodiments, if the comparison results in more than one matching profile, the event processing and identity validation system displays the results to the user at the sending end of the event request to choose a profile from the more than one matching profiles. For example, when the search based on comparing the last name and address results in multiple matching profiles, the event processing and identity validation system displays the multiple matching profiles to the sender of the event request and prompts the sender to select one profile from the multiple matching profiles. In some embodiments, the event processing and identity validation system 500 upon determining a no match based on comparing the user identifying information and the sets of identity information of the set of profile, prompts the user at the sending end of the event request to enter additional user identifying information.

Next, as shown in block 670, the event processing and identity validation system 500 processes the event request. In some embodiments, processing the event request includes communicating with multiple systems to complete the event request. For example, the event processing and identity validation system initiates the process of communicating with the recipient's user devices to complete the event request. In some embodiments, processing the event request further comprises validating the user at the receiving end of the event request using an authentication code. In some embodiments, processing the event request further comprises validating the user at the receiving end of the event request using an image matching process. In some embodiments, processing the event request includes, transmitting a validation message and a portion of the set of identity information of the matching profile to the system transmitting the event request, wherein the system transmitting the event request may be an entity system 400, other entity system 401, third party system 402, and/or other third party systems 403. For example, a third party system may transmit the event request such as transfer of funds to the event processing and identity validation system to verify the user information of the recipient of the event request. The event processing and identity validation system may then verify the user information and transmit a successful validation message and other information such as account routing number and account number associated with the recipient to the third party system such that the third party system completes the processing of the event request.

In an example embodiment, the event processing and identity validation system 500 accesses a set of profiles from third party systems or from one or more entity systems. The system 500 then validates the information in each profile such as phone number, email address and the like, such as by communicating with a network provider associated with the phone number and an email managing provider associated with the email address to verify if the information associated with a user is still active. The system 500 upon receiving transfer of funds request comprising the first name, last name, phone number of the recipient of funds from a financial institution, compares the first name, last name and phone number with the set of profiles and determines a matching profile with the recipient's first name, last name and phone number. The system 500 then completes the transfer of funds to the validated recipient. In one particular embodiment, the recipient may be required to authenticate their identity such as by employing the process described below, before the system 500 completes the transfer of funds.

FIG. 7 illustrates a process flow 700 for validating the identity of the user associated with the event request using an authentication code, wherein the user is the recipient of the event request. As shown in block 710, the event processing and identity validation system 500 generates an authentication code. In some embodiments, the authentication code may be a four digit pin with a combination of numbers, special characters and alphabets. In some embodiments, the authentication code may be an image. In some other embodiments, the authentication code may be any digit code comprising a combination of numbers, special characters and alphabets.

At block 720, the event processing and identity validation system 500 associates the generated authentication code with the event request. For example, the event processing and identity validation system 500 generates a unique authentication code for every event request and links the generated authentication code with the respective event request for the purpose of validation. In some embodiments, the event processing and identity validation system 500 associates the generated authentication code with the event request by creating a log in the memory of the system 500, wherein the log comprises identification number of the event request and the associated authentication code.

Next as shown in block 730, the event processing and identity validation system 500 notifies the user of the event request, wherein the event request is an incoming event request to the user at the receiving end. In some embodiments, the event processing and identity validation system 500 notifies the user of the incoming event request by sending a message to a registered user device associated with the user, wherein the registered user device may be a personal computing device, mobile device and/or the like. The registered user device described herein may be any user device associated with the user which is used to register for a service provided by the entity system 400 or event processing and identity validation system 500. In some embodiments, the registered user device described herein may be any user device associated with a registered parameter of the set of identity information such as a phone number. For example, the system 500 transmits a message to the user, wherein the message comprises information about the incoming transfer of funds as described in the example above. In some embodiments, the event processing and identity validation system 500 notifies the user of the incoming event request only when the event processing and identity validation system 500 detects online activity from the registered user device associated with the user. In some other embodiments, the event processing and identity validation system 500 causes the graphical user interface of the registered user device to display a notification of the incoming event request. In some embodiments, in response to receiving the request the user travels to a defined authentication location to receive the incoming event request. In some embodiments, authentication location is defined by the user. In some embodiments, the event processing and identity validation system 500 may suggest an alternative location to the user. For example, when the user marks a location as the authentication location, the system 500 may check if the location is a high traffic area. The system 500 may suggest an alternative location with less traffic upon determining that traffic at the location is higher than a defined value. In alternative embodiments, the event processing and identity validation system may define the authentication location. For example, the system 500 accesses the most visited places stored in the profile of the user to define any of the most visited places as the authentication location and prompts the user to approve the authentication location defined by the system 500. In some embodiments, the event processing and identity validation system 500 notifies the user of the event request and prompts the user to travel to the authentication location. In some embodiments, the event processing and identity validation system 500 stores the defined authentication location in the remittance repository along with the other set of identity information. In some embodiments, the defined distance is set by the user. In alternate embodiments, the defined distance is set by the event processing and identity validation system 500. For example, the event processing and identity validation system 500 assigns a value of XX feet for the defined distance. U.S. patent application Ser. No. 15/287,553 for a SYSTEM FOR LOCATION BASED AUTHENTICATION filed on Oct. 6, 2016, which is hereby incorporated by reference in its entirety, describes various processes for authenticating the identity of user based on a defined authentication location that may be employed by the system 500.

As shown in block 740, the event processing and identity validation system 500 monitors (e.g., continuously or periodically) the location of the user device to determine that the user device is within a defined distance from the authentication location in response to notifying the user. For example, the user in response to receiving the notification for the incoming transfer of funds travels to a location with the registered user device such as a mobile phone which is marked as a safe place and the event processing and identity validation system 500 detects that the mobile phone of the user is within a defined distance from the authentication location.

At block 750, the event processing and identity validation system 500 upon determining that the registered user device is within the defined distance from the authentication location, automatically transmits the generated authentication code to the registered user device. For example, the event processing and identity validation system 500 transmits the generated authentication code to the mobile device of the user after determining the location of the mobile phone of the user to be within a defined distance from the authentication location. In some embodiments, the user travels to the authentication location and sends a trigger to the event processing and identity validation system 500 to transmit the generated authentication code. In some embodiments, the system 500 identifies that the location of the user is at a most visited placed stored in the profile of the user and instead of prompting the user to travel to the authentication location, the system 500 prompts the user to enter the location of the authentication location. The system 500 upon validating the location of the authentication location received from the user, transmits the generated authentication code to the registered user device. In one particular embodiment, the validation of the location received from the user is accompanied by any other authentication method.

As shown in 760, the event processing and identity validation system 500 receives a key code from a computing device. In some embodiments, the computing device may be a personal computing device of the user, a user mobile phone, other user computing device, a point of sale device, an automated teller machine, and/or the like. In some embodiments, the computing device receives the key code as an input form the user. In some other embodiments, the computing device receives the key code automatically from the registered device. For example, the registered device and the computing device may be the same device such as the mobile device of the user. The mobile device upon receiving the generated authentication code automatically transmits the authentication code as the key code to the event processing system application on the device of the user. The event processing and identity validation system 500 receives the key code directly from the event processing system application stored in the memory of the mobile phone associated with the user.

The event processing and identity validation system 500 as shown in block 770, compares the received key code with the generated authentication code associated with the event request and determines a match between the received key code and the generated authentication code as shown in block 780. In some embodiments, when the received key code and generated authentication code do not match, the event processing and identity validation system 500 generates a new authentication code and repeats the process from block 720 to block 780. In some embodiments, when the received key code and the generated authentication code do not match, the event processing and identity validation system 500 freezes the processing of the event request.

As shown in block 790, the event processing and identity validation system 500 upon determining a match between the received key code and the generated authentication code, validates the user and completes the event request. For example, the event processing and identity validation system 500 determines a match between the received key code and the generated authentication code, validates the identity of the user, and transfers the incoming transfer of funds to an account selected by the user. In some embodiments, when the event request is transfer of funds, the user may set preferences associated with the incoming transfer of funds by accessing the event processing application stored in the memory of the registered user device. For example, the user may select a checking account for all incoming transfer of funds below $XXX.XX and the user may select a savings account for all incoming transfer of funds above $XXX.XX.

FIG. 8 illustrates a process flow 800 for processing the event request and validating the identity of a user at the receiving end of the event request using a user image, in accordance with an embodiment of the present invention. Similar to the process in block 730, the event processing and identity validation system 500 notifies the user of the event request in block 810, wherein the user is the recipient of the event request. In some embodiments, the event processing and identity validation system 500 notifies the user of the incoming event request by sending a message to a registered user device associated with the user, wherein the registered user device may be a personal computing device, mobile device and/or the like. The registered user device described herein may be any user device associated with the user which is used to register for the service provided by the entity system 400 or event processing and identity validation system 500. In some embodiments, the registered user device described herein may be any user device associated with a registered parameter of the set of identity information such as a phone number. For example, the event processing and identity validation system 500 transmits a message to the user, wherein the message comprises information about the incoming transfer of funds as described in the example above. In some embodiments, the event processing and identity validation system 500 notifies the user of the incoming event only when the event processing and identity validation system 500 detects online activity from the registered user device associated with the user, wherein the registered user device may be a personal computing device or a mobile device associated with the user. In some other embodiments, the event processing and identity validation system 500 causes the graphical user interface of the registered user device to display a notification of the incoming event request.

Next as shown in block 820, the event processing and identity validation system 500 prompts the user to upload a user image. The user image described herein may be an image of the user identification card or a user image captured by accessing the camera of a computing device, wherein the computing device may be a mobile phone, an Automated Teller Machine, a personal computing device and/or the like used by the user to process the incoming event request. In some embodiments, in response to receiving the notification, the user accesses a computing device to initiate the process of receiving the event request. For example, the user accesses a nearby Automated Teller Machine to receive the incoming transfer of funds. In some embodiments, the event processing and identity validation system 500 prompts the user to upload an identification card image based on detecting that the user has accessed a computing device to initiate the process of receiving the incoming event request. In some embodiments, the event processing and identity validation system 500 instead of prompting the user to upload an identification card image, prompts the user to capture a picture using the camera of the computing device. For example, the event processing and identity validation system 500 prompts the user to capture a picture using the camera of the mobile phone, wherein the mobile phone is the computing device used to process the incoming transfer of funds. In some embodiments, the event request may include physical processes such as physical delivery of funds. In such an embodiment, an agent delivering the funds to the recipient asks the user to provide a photo identification card to validate the user identity.

Next as shown in block 830, the event processing and identity validation system 500 receives the user image based on prompting the user to upload a user image. In some embodiments, the event processing and identity validation system 500 receives the image from a computing device, wherein the computing device receives the image as an input from the user. The computing device may be a personal computing device, a mobile phone, other computing devices such as an Automated Teller Machine, point of sale device, or the like. In some embodiments, the event processing and identity validation system 500 receives the user image from the user computing device, wherein the user computing device automatically extracts the user image from the memory of the computing device by notifying the user. For example, if the computing device is a mobile phone, the system application installed on the mobile phone of the user automatically extracts the photo identification card image from the memory of the mobile phone.

At block 840, the event processing and identity validation system 500 validates the user image by comparing information from the user image with the information associated with the matching profile. In one embodiment, wherein the user image is an identification card image, the event processing and identity validation system 500 extracts the information from the user image such as first name, last name, date of birth, address and compares the extracted information with the set of information associated with the matching profile determined in block 660. In some embodiments, wherein the user image is an identification card image, the event processing and identity validation system 500 extracts the picture of the user from the identification card image and compares the picture of the user with the picture from the set of information associated with the matching profile determined in block 660. In some embodiments, wherein the user image is the identification card, and wherein the event request is physical transfer of funds, the agent compares the information on the identification card provided by the user with the set of information associated with the matching profile determined in block 660. In some embodiments, such as wherein the user image is the image captured by the camera of the computing device, the event processing and identity validation system 500 compares the image with the picture of the user from the set of identity information associated with the matching profile described in block 660 using facial recognition mechanism.

At block 850, upon successful validation of the user image, the event processing and identity validation system 500 completes the event request. For example, the event processing and identity validation system 500 determines a match between the information from the user image and the set of identity information of matching profile, validates the identity of the user, and transfers the incoming transfer of funds to an account selected by the user. In some embodiments, when the event request is transfer of funds, the user may set preferences associated with the incoming transfer of funds by accessing the event processing application stored in the memory of the registered user device. For example, the user may select a checking account for all incoming transfer of funds below $XXX.XX and the user may select a savings account for all incoming transfer of funds above $XXX.XX.

In a particular embodiment of the present invention, the event processing and identity validation system 500 receives user identifying information comprising a first image with an event request from the sender of the event request in block 640, wherein information from the first image is used to identify the recipient of the event request and/or authenticate the recipient of the event request. In one particular embodiment, wherein the first image is a photo identification card of the user at the receiving end of the event request, the event processing and identity validation system 500 extracts information from the first image. For example, the event processing and identity validation system 500 extracts information such as first name, last name, address, picture of the recipient and/or the like using optical character recognition (OCR) system or facial recognition system. The optical character recognition system described herein may be a system used to electronically or mechanically convert images of typed, handwritten or printed text into machine encoded text. The facial recognition system described herein may be capable of identifying or verifying a person from the first image by comparing selected facial features from the first image with the facial information stored in the profile. The event processing and identity validation system 500 compares the extracted information with the sets of identity information of the set of profiles. The event processing and identity validation system 500 then determines a matching profile from the set of profiles based on comparing the extracted information with the sets of identity information of the set of profiles and processes the event request. For example, the event processing and identity validation system 500 compares the extracted information from the first image to determine a matching profile from the set of profiles and processes the incoming transfer of funds. The event processing and identity validation system 500 notifies the user of the event request. For example, the event processing and identity validation system 500 transmits a message to the user, wherein the message comprises information about the incoming transfer of funds.

The event processing and identity validation system 500 after notifying the user of the event request, prompts the user to upload an identification card image when the user accesses a computing device to initiate the process of receiving the event request. For example, when the user accesses a nearby Automated Teller Machine to receive the incoming transfer of funds, the event processing and identity validation system 500 prompts the user to upload an identification card image. The event processing and identity validation system 500 receives an identification card image and validates the identification card image by comparing information from the identification card image with the extracted information from the first image. For example, the event processing and identity validation system 500 extracts the information from the identification card image such as first name, last name, date of birth, address and compares the extracted information with the information extracted from the first image. Upon determining a match between the extracted information from identification card image and the first image, the event processing and identity validation system 500 completes the event request. For example, the event processing and identity validation system 500 upon authenticating the user completes the transfer of funds to the account of the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other than that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for processing electronic events, whereby the system provides validation of identity, the system comprising:
   a computer apparatus including a processor and a memory; and
   a software module stored in the memory, comprising executable instructions that when executed by the processor cause the processor to:
   identify a set of profiles associated with a set of users;
   for each profile of the set of profiles, identify a set of identity information;
   for each profile of the set of profiles, validate the set of identity information;
   receive an event request, wherein the event request comprises user identifying information;
   compare the user identifying information with the sets of identity information of the set of profiles;
   determine a matching profile from the set of profiles based on comparing the user identifying information and the sets of identity information of the set of profiles, wherein the matching profile is associated with a user;
   in response to determining the matching profile, process the event request;
   generate an authentication code in response to processing the event request;
   associate the generated authentication code with the event request;
   notify the user of the event request;
   determine that a device of the user is within a defined distance of an authentication location and, based on determining that the device of the user is within the defined distance of the authentication location, automatically transmit the generated authentication code to the device of the user;
   receive a key code from a computing device, wherein the computing device receives the key code as an input from the user;
   compare the received key code with the generated authentication code;
   determine a match between the received key code and generated authentication code; and
   in response to determining the match between the received key code and generated authentication code, complete the event request.

2. The system of claim 1, wherein the software module stored in the memory comprises executable instructions that when executed by the processor further causes the processor to:
   notify the user of the event request in response to processing the event request;
   prompt the user to upload a user image;
   receive the user image from the computing device;
   validate the user image by comparing information from the user image with the set of identity information associated with the matching profile;
   upon successful validation, complete the event request.

3. The system of claim 1, wherein the user identifying information comprises a first image, wherein determining the matching profile further comprises:
   extracting information from the first image;
   comparing the extracted information from the first image with the sets of identity information of the set of profiles to determine the matching profile.

4. The system of claim 3 wherein the software module stored in the memory comprises executable instructions that when executed by the processor further causes the processor to:
   notify the user of the event request in response to processing the event request;
   prompt the user to upload an user image;
   receive the user image from the computing device;
   validate the user image by comparing information from the user image with the information from the first image; and
   upon successful validation, complete the event request.

5. The system of claim 1 wherein, for each profile of the set of profiles, validating the set of identity information is performed periodically.

6. The system of claim 1, wherein the system is maintained by an entity and the event request is transmitted by the entity.

7. The system of claim 1, wherein the event request is transmitted by a third party system, wherein validating the event request comprises sending a validation message to the third party system and transmitting at least a portion of the set of identity information of the matching profile.

8. A computer program product for processing electronic events, wherein the computer program product comprises a non-transitory computer-readable storage medium having computer-executable instructions to:
   identify a set of profiles associated with a set of users;
   for each profile of the set of profiles, identify a set of identity information;
   for each profile of the set of profiles, validate the set of identity information;
   receive an event request, wherein the event request comprises user identifying information;

compare the user identifying information with the sets of identity information of the set of profiles;
determine a matching profile from the set of profiles based on comparing the user identifying information and the sets of identity information of the set of profiles, wherein the matching profile is associated with a user;
in response to determining the matching profile, process the event request;
generate an authentication code in response to processing the event request;
associate the generated authentication code with the event request;
notify the user of the event request;
determine that a device of the user is within a defined distance of an authentication location and, based on determining that the device of the user is within the defined distance of the authentication location, automatically transmit the generated authentication code to the device of the user;
receive a key code from a computing device, wherein the computing device receives the key code as an input from the user;
compare the received key code with the generated authentication code;
determine a match between the received key code and generated authentication code; and
in response to determining the match between the received key code and generated authentication code, complete the event request.

9. The system of claim 1, wherein validating the set of identity information comprises implementing a set of routines, wherein the set of routines comprises communicating with one or more third party systems associated with the set of identity information to verify if the at least a portion of the set of identity information is still active.

10. The computer program product of claim 8, wherein the non-transitory computer-readable storage medium further comprises computer-executable instructions to:
notify the user of the event request in response to processing the event request;
prompt the user to upload a user image;
receive the user image from the computing device;
validate the user image by comparing information from the user image with the set of identity information associated with the matching profile;
upon successful validation, complete the event request.

11. The computer program product of claim 8, wherein the user identifying information comprises a first image, wherein the non-transitory computer-readable storage medium further comprises computer-executable instructions to determine the matching profile by extracting information from the first image and comparing the extracted information from the first image with the sets of identity information of the set of profiles.

12. The computer program product of claim 11, wherein the non-transitory computer-readable storage medium further comprises computer-executable instructions to:
notify the user of the event request in response to processing the event request;
prompt the user to upload an user image;
receive the user image from the computing device;
validate the user image by comparing information from the user image with the information from the first image; and
upon successful validation, complete the event request.

13. The computer program product of claim 8, wherein the non-transitory computer-readable storage medium further comprises computer-executable instructions to validate the set of identity information for each profile of the set of profiles periodically.

14. A method for validating identity and processing electronic events, wherein the method comprises:
identifying a set of profiles associated with a set of users;
for each profile of the set of profiles, identifying a set of identity information;
for each profile of the set of profiles, validating the set of identity information;
receiving an event request, wherein the event request comprises user identifying information;
comparing the user identifying information with the sets of identity information of the set of profiles;
determining a matching profile from the set of profiles based on comparing the user identifying information and the sets of identity information of the set of profiles, wherein the matching profile is associated with a user;
in response to determining the matching profile, processing the event request;
generating an authentication code in response to validating the event request;
associating the generated authentication code with the event request;
notifying the user of the event request;
determining that a device of the user is within a defined distance of an authentication location and, based on determining that the device of the user is within the defined distance of the authentication location, automatically transmit the generated authentication code to the device of the user;
receiving a key code from a computing device, wherein the computing device receives the key code as an input from the user;
comparing the received key code with the generated authentication code;
determining a match between the received key code and generated authentication code; and
in response to determining the match between the received key code and generated authentication code, completing the event request.

15. The computer program product of claim 8, wherein the non-transitory computer-readable storage medium further comprises computer-executable instructions to validate the set of identity information comprises implementing a set of routines, wherein the set of routines comprises communicating with one or more third party systems associated with the set of identity information to verify if the at least a portion of the set of identity information is still active.

16. The method according to claim 14, wherein the method further comprises:
notifying the user of the event request in response to processing the event request;
prompting the user to upload a user image;
receiving the user image from the computing device;
validating the user image by comparing information from the user image with the set of identity information associated with the matching profile;
upon successful validation, completing the event request.

17. The method according to claim 14, wherein the user identifying information comprises a first image, wherein determining the matching profile further comprises:
extracting information from the first image;
comparing the extracted information from the first image with the sets of identity information of the set of profiles to determine the matching profile.

18. The method according to claim 17, wherein the method further comprises:
- notifying the user of the event request in response to validating the event request;
- prompting the user to upload an user image;
- receiving the user image from the computing device;
- validating the user image by comparing information from the user image with the information from the first image; and
- upon successful validation, completing the event request.

19. The method according to claim 14, wherein validating the set of identity information is performed periodically.

20. The method according to claim 14, wherein validating the set of identity information comprises implementing a set of routines, wherein the set of routines comprises communicating with one or more third party systems associated with the set of identity information to verify if the at least a portion of the set of identity information is still active.

* * * * *